UNITED STATES PATENT OFFICE.

RENÉ BOHN, OF MANNHEIM, GERMANY, ASSIGNOR TO BADISCHE ANILIN & SODA FABRIK, OF LUDWIGSHAFEN, GERMANY, A CORPORATION.

BLUE SULFONATED DYE.

SPECIFICATION forming part of Letters Patent No. 692,762, dated February 4, 1902.

Application filed November 29, 1901. Serial No. 84,127. (No specimens.)

*To all whom it may concern:*

Be it known that I, RENÉ BOHN, doctor of philosophy and chemist, a citizen of the Swiss Republic, residing at Mannheim, in the Grand Duchy of Baden, Germany, have invented new and useful Improvements in Blue Sulfonated Coloring-Matter, of which the following is a specification.

In the specification of Patent No. 682,523, dated September 10, 1901, are described a new blue coloring-matter, a leuco or hydro product, and an oxidation product thereof. The said coloring-matter is obtained by heating beta-amido-anthraquinone or beta-amido-anthraquinone sulfo-acid with caustic alkali at a high temperature.

My present invention relates to the production of sulfonated forms of the said blue coloring-matter—its leuco and oxidation products. To attain this end, I can proceed by two methods, which may be considered equivalents for the purposes of this invention. I can carefully operate on beta-amido-anthraquinone sulfo-acid at lower temperatures than those mentioned in the said Specification No. 682,523—namely, at from one hundred and fifty to one hundred and seventy-five degrees centigrade—and so obtain a sulfo-acid of the said blue coloring-matter or its leuco compound, either of which can be converted into an oxidation product, or I can treat the blue coloring-matter of the Specification No. 682,523 with sulfonating agents and obtain sulfo-acids, which can be reduced and oxidized.

The following examples will serve to illustrate the nature of my invention and the manner in which the same may be carried into practical effect; but the invention is not confined to these examples. The parts are by weight.

*Example 1—Production of a sulfonated blue coloring-matter from beta-amido-anthraquinone sulfo-acid and caustic potash.*—Intimately mix ten (10) parts of beta-amido-anthraquinone sulfo-acid and twenty (20) parts of powdered potassium hydrate and heat for from half an hour to an hour in an oil-bath at a temperature of from one hundred and fifty (150) to one hundred and seventy-five (175) degrees centigrade. Pour the blue-black melt thus obtained into one thousand (1,000) parts of water and boil the mixture. The sulfo-acid formed separates out in blue flocks, which are insoluble in dilute caustic-potash solution. Wash with a boiling dilute solution of common salt and dry. To purify the coloring-matter, recrystallize it from boiling water. It is fairly easily soluble in boiling water and dyes wool and silk blue shades of great fastness. On suitable reduction it also forms a vat, by means of which cotton can be dyed directly. In the dry state it is a blue powder, which dissolves in water, the solution being a pure blue. In sulfuric acid (containing ninety-six per cent. of $H_2SO_4$) it dissolves, the solution being olive-green. In fuming sulfuric acid (containing twenty-three per cent. of free $SO_3$) it dissolves, the solution being brown-red. In a mixture of nitric and concentrated sulfuric acid it dissolves, the solution being yellow-red. Caustic soda precipitates the coloring-matter from its aqueous solution in blue flocks. Caustic soda and sodium hydrosulfite convert it into a blue vat. The sulfo-acid is converted by chromic acid or other suitable oxidizing agent into a new yellow oxidation product, which is soluble in water and dyes wool green-blue shades. On reduction of this oxidation product the blue sulfonated coloring-matter is again formed.

*Example 2—Sulfonation of the blue coloring-matter formed by the action of caustic alkali on beta-amido-anthraquinone.*—Mix together five (5) parts of boracic acid and ten (10) parts of the blue coloring-matter, which can be obtained by fusing beta-amido-anthraquinone with caustic potash and dissolving the melt in water containing air. Heat this mixture with two hundred (200) parts of fuming sulfuric acid (containing about twelve per cent. of free $SO_3$) for three (3) hours at a temperature of one hundred and thirty (130) degrees centigrade or until a test portion is completely soluble in a large quantity of water. Pour the melt into five hundred (500) parts of water and boil. The sulf-oacid of the blue coloring-matter, which is insoluble in dilute sulfuric acid, separates out in blue flocks. Filter off and wash with hot dilute common-salt solution. This new sulfo-acid dissolves in water, the solution being greenish blue and dyeing animal fiber bluish-green shades of great fastness. It dissolves in sulfuric acid, (containing ninety-six per cent. of $H_2SO_4$,) the solution being olive-green. In fuming sulfuric acid (containing twenty-three per cent. of free $SO_3$) it dissolves, the solution being brown-red. In a mixture of nitric acid and concentrated sulfuric acid it dissolves, the solution being yellow-red. It is precipitated by caustic soda from its aqueous solution in blue flocks. On treatment with caustic soda and sodium-hydrosulfite solution or other suitable reducing agent it forms a blue vat, by means of which cotton can be directly dyed blue. Oxidizing agents, such as chromic acid, convert it into a new yellow product soluble in water, which dyes wool green-blue shades. On reduction this yellow oxidation product is converted into the original sulfonated coloring-matter.

Now what I claim is—

The new blue sulfonated coloring-matter such as can be obtained by fusing a beta-amido-anthraquinone body with caustic potash and causing a sulfo group to remain attached to the molecule, which dissolves in concentrated sulfuric acid (containing about ninety-six per cent. of $H_2SO_4$) with an olive-green color, and in fuming sulfuric acid (containing about twenty-three per cent. of free $SO_3$) with a brown-red color, which in its reduced form directly dyes cotton blue, and in its oxidized form dyes wool green-blue.

In testimony whereof I have hereunto set my hand in the presence of two subscribing witnesses.

RENÉ BOHN.

Witnesses:
BERNHARD C. HESSE,
JACOB ADRIAN.